N. MAYENSCHEIN.
ATTACHMENT FOR PLOWS.
APPLICATION FILED MAY 25, 1911.
1,070,975.
Patented Aug. 19, 1913.
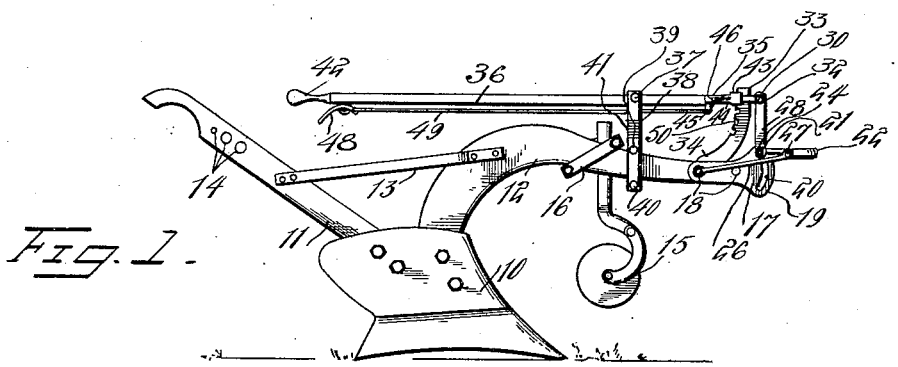
Fig. 1.
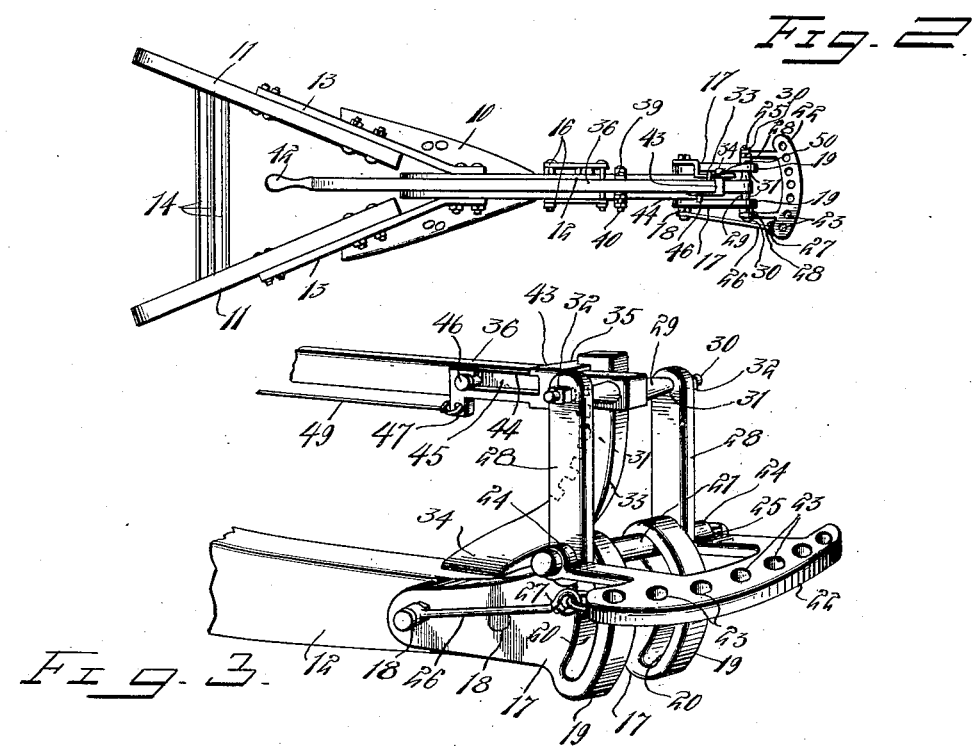
Fig. 2.
Fig. 3.
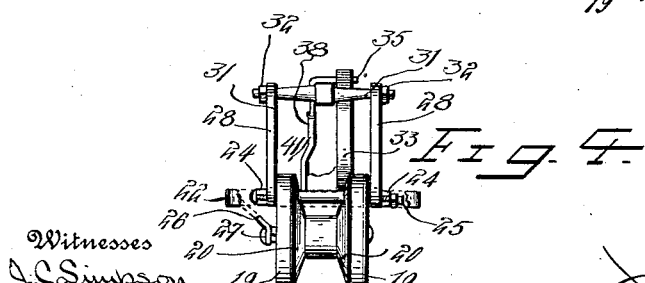
Fig. 4.
Witnesses
J. C. Simpson.
Inventor
N. Mayenschein.
By Chandler & Chandlee
Attorneys

UNITED STATES PATENT OFFICE.

NORMAN MAYENSCHEIN, OF HILLSBORO, WISCONSIN.

ATTACHMENT FOR PLOWS.

1,070,975.  Specification of Letters Patent.  Patented Aug. 19, 1913.

Application filed May 25, 1911. Serial No. 629,390.

*To all whom it may concern:*

Be it known that I, NORMAN MAYENSCHEIN, a citizen of the United States, residing at Hillsboro, in the county of Vernon, State of Wisconsin, have invented certain new and useful Improvements in Attachments for Plows; and I do hereby declare the following to be a full, clear, and exact description of the invention, such as will enable others skilled in the art to which it appertains to make and use the same.

This invention relates to new and useful improvements in attachments for plows whereby the depth of the furrow or the angle of operation of the plow may be regulated.

The specific object of the invention resides in providing an improved and simple device for the above purpose whereby the depth of the furrow may be regulated in a convenient manner by the plowman without the necessity of the plowman leaving the furrow or plow handle or as often necessary, to back the team to provide sufficient slack to change the positions of the adjusting pin to which the eveners of the draft are attached.

A still further object of the invention is to provide a novel form of mounting for the draft clevis having attachment with an operating lever extending rearwardly of the plow for convenient operation and which may be supported in different adjusted positions.

With these and other objects in view the invention consists of certain other combinations and arrangements of parts as will be hereinafter more fully described and claimed, it being a still further object to provide a device which will not be likely to get out of working order.

In the drawings:—Figure 1 is a side elevation of a plow having my improved device attached to the beam thereof. Fig. 2 is a top plan view thereof. Fig. 3 is an enlarged detail perspective view of a portion of the beam and attachment at the forward end thereof. Fig. 4 is a front elevation of the device shown in Fig. 3.

Referring to the drawings in detail, there is shown a plow 10 having the usual handles 11 extending rearwardly thereof in an inclined position and which are braced to the upwardly curved and forwardly extended beam 12 as by means of rods 13, said handles being also rigidly braced in spaced relation by the members 14. A gage wheel 15 is secured beneath the central portion of the beam 12 by the brace strips 16, the above named structure forming the parts of the plow to which my improved attachment is applied.

In carrying out my invention, a pair of spaced jaw plates 17 are securely bolted as shown at 18 to opposite side faces of the forward end of the beam 12 and the enlarged forward portions 19 of said plates are provided with alined vertical slots 20, said slots being curved as shown and adapted to receive a transverse bolt 21 for sliding movement. A draft clevis 22 having a series of apertures 23 vertically therethrough for the attachment of the usual or any preferred form of evener, is provided with rearwardly extending and preferably integrally formed apertured ears 24 through which the bolt 21 is disposed and secured at one end by a nut 25 so as to hold said parts together but permit free pivotal movement thereof within the slots.

A rod 26 is connected to the clevis plate 22 upon its rear edge at one end as shown at 27 and is pivotally secured at its opposite end to the rearmost attaching bolt 18, the forward end of said rod being located on a line with the slots 20 in the jaw plates 17 and concentric with the pivot point or rear end of the said rod, thereby compensating for the various changes in position of the clevis and its attaching bolt within the slots 20. A pair of spaced vertical extending plates 28 are also pivotally connected to the bolt 21 between the enlarged portions 19 of the jaw plates 17 and the apertured ears 24 carried by the clevis 22 and the upper ends of the plates are held in spaced relation parallel to each other by a bolt 29 having an enlarged central portion with reduced threaded ends 30 so as to form interior shoulders 31 against which the plates 28 abut and are held in such relation and nuts 32 are attached to said reduced threaded ends 30 to securely hold the upper ends of the plates in position.

A vertical rack bar 33 is secured by its lower offset portion 34 to the plow beam 12 outwardly of one of the jaw plates and is adapted to be engaged by a locking dog 35 in order to hold a lever 36 and parts operated thereby in an adjusted position. The lever 36 is extended longitudinally and in an inclined position spaced above the plow beam 12 and it is pivotally mounted intermediate of its ends and preferably nearer to its forward end upon a pivot bolt 37 which is also disposed transversely through a pair of spaced supporting plates 38 which are secured at their lower ends upon opposite sides of the plow beam directly therebeneath by means of the attaching bolts 39 and 40 disposed in engagement with an inbinding contact with the upper and lower faces of the plow beam to rigidly support the said plates in a vertical position. In order to provide for the pivotal attachment of the lever 36, the plates 38 are offset inwardly as shown at 41 so as to bring the same in closer relation at their upper ends. The forward end of the lever 36 is rigidly attached to the bolt member 29 by welding and has an aperture transversely receiving the said bolt so that actuation of the lever upon its pivot 37 by grasping its handle portion 42 and exerting upward or downward pressure thereon will serve to raise or lower the forward end of the lever and communicate motion to the clevis through the connecting plates 28 and the pivot bolt 21. During this movement the clevis will be held in a horizontal position by the rod 26 and the pivot bolt will travel within the slots 20 in the arc of a circle concentric with the pivotal attachment of the rod 26 relative to the path of movement of the clevis, thereby supporting the clevis in different vertical positions of adjustment whereby the angle of operation of the plow and the consequent depth of the furrow may be regulated.

The locking dog 35 is provided with a sleeve portion 43 and a rearwardly extending attaching plate 44 which is provided with a longitudinal slot 45 slidably engaged upon a headed pin 46 secured to the forward portion of the lever and said plate is provided with a securing ear or lug 47 which is connected to an operating grip 48 pivoted at the grasping end of the lever by means of a rod 49 so as to permit actuation of the locking dog 35 to engage the teeth of the rack bar 33 said teeth 50 being located upon the rear edge of said bar. By this means said lever may be held in its adjusted position and the clevis correspondingly stationed.

From the foregoing description in connection with the accompanying drawings, it will be seen that I have provided an efficient device for the purpose intended and which will avoid the inconvenient manner and requirement of adjusting the clevis now generally necessary. The device will be found especially desirable in plowing hills, in working up or down grade and when working on hilly fields, will avoid uneven plowing of the furrow and the necessity of the laborious task of removing an adjusting pin and supporting the eveners while removing and replacing the same, as well as efficiently serving to regulate the plow for a shallow or deep furrow.

I claim:—

1. The combination with a plow beam, of slotted plates attached to the forward end of a plow beam and having opposed arcuate slots, a clevis having spaced apertured ears engaging at the outer sides of the plates, a pivot connecting said ears and operating through the slots to allow vertical movement of the clevis, links connected to the plates and clevis for retaining the latter in a horizontal position during its vertical movement and means connected with the pivots for moving the clevis.

2. An attachment for plow beams for regulating the depth of a furrow comprising slotted plates rigidly secured and projecting forwardly of the forward end of the beam, a clevis having spaced rearwardly extending portions engaged outwardly of said slotted plates, a link pivoted to one end of the slotted plates and loosely connected to one end of the clevis, spaced vertical members connected to the rearwardly extending portions of the clevis and means connected to the upper extremities of said rearwardly extending portions of the clevis to raise and lower the clevis.

3. The combination with a plow beam having slotted plates at its forward end; of a pivot engaged through the slotted plates for vertical movement in an arcuate path, a clevis loosely connected to the pivot, spaced vertical plates connected to the clevis and extending above the beam, a rack bar carried by the beam and offset to extend on a line between the plates, a lever pivoted intermediate of its ends to the beam and extending rearwardly of the plow, a spacing member connected to the forward end of the lever and to the upper extremities of the plates whereby movement of the rear end of the lever will shift the plates and a sliding latch member carried by the lever to engage the rack bar and hold the clevis in an adjusted position.

In testimony whereof, I affix my signature, in presence of two witnesses.

NORMAN MAYENSCHEIN.

Witnesses:
J. F. MAYENSCHEIN,
HENRY KAUFFMAN.

---

Copies of this patent may be obtained for five cents each, by addressing the "Commissioner of Patents, Washington, D. C."